United States Patent
Choi et al.

(10) Patent No.: US 7,636,402 B2
(45) Date of Patent: Dec. 22, 2009

(54) ENHANCED VSB TRANSMITTER AND RECEIVER

(75) Inventors: In Hwan Choi, Gwacheon-si (KR); Kyung Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 11/304,907

(22) Filed: Dec. 14, 2005

(65) Prior Publication Data

US 2006/0126757 A1 Jun. 15, 2006

(30) Foreign Application Priority Data

Dec. 15, 2004 (KR) .................. 10-2004-0106190

(51) Int. Cl.
*H03C 1/52* (2006.01)
(52) U.S. Cl. ........................................ 375/301
(58) Field of Classification Search ............. 375/301; 370/535, 468
See application file for complete search history.

(56) References Cited

U.S. PATENT DOCUMENTS

2002/0172277 A1* 11/2002 Choi et al. .......... 375/240.01
2004/0090997 A1* 5/2004 Choi et al. ................ 370/535

FOREIGN PATENT DOCUMENTS

CN 1543219 11/2004

* cited by examiner

*Primary Examiner*—Mohammad H Ghayour
*Assistant Examiner*—Tanmay K Shah
(74) *Attorney, Agent, or Firm*—Lee, Hong, Degerman, Kang & Waimey

(57) ABSTRACT

An enhanced VSB transmitter includes a data attribute generator which generates data attribute information based on a current enhanced mode map, and a VSB pre-processor which codes first and second supplemental data for error correction, interleaves the coded supplemental data, and expands the interleaved data at first and second rates, respectively, according to the data attribute information. The transmitter further includes a multiplexer which multiplexes main data with the expanded supplemental data according to the data attribute information, and a VSB processor which codes the data multiplexed by the multiplexer for error correction.

26 Claims, 8 Drawing Sheets

ENHANCED VSB TRANSMITTER AND RECEIVER

This application claims the benefit of the Korean Patent Application No. 10-2004-0106190, filed on Dec. 15, 2004, which is hereby incorporated by reference as if fully set forth herein.

BACKGROUND OF THE INVENTION

1. Field of the Invention

The present invention relates to a data transmitting and receiving device, and more particularly, to an E8-VSB transmitter and receiver.

2. Discussion of the Related Art

Since the second half of 1998, the United States of America has adopted an advanced television systems committee (ATSC) 8 vestigial sideband (VSB) transmission method as the 1995 standard for broadcasting. Presently, the Republic of Korea is also providing broadcast programs by adopting the ATSC 8VSB transmission method as the standard for broadcasting. Such ATSC 8VSB transmission method has been established for the essential purpose of high definition imaging.

However, a system that may deteriorate the picture quality, yet stably receive incoming images, or a transmission standard for a system enabling data to be received with more stability as compared to video signals, due to the contents of the data, has also been on demand in the ATSC 8VSB transmission method. In addition, such additional transmission standards are to be regulated within the scope of not affecting the system for receiving the conventional ATSC 8VSB signal. And, also, the receiver of a newly established standard is regulated to be able to receive both the conventional ATSC 8VSB signal and the enhanced 8-VSB (hereinafter referred to as E8-VSB) signal. Accordingly, the E8-VSB transmitting/receiving system adopts the conventional 8VSB system and adds new types of services, which enable more enhanced reception of signals to be performed. Furthermore, due to the newly added services, the conventional services are also enabled to perform stable receiving functions.

SUMMARY OF THE INVENTION

Accordingly, the present invention is directed to an E8-VSB transmitter and receiver that substantially obviate one or more problems due to limitations and disadvantages of the related art.

An object of the present invention is to provide an E8-VSB transmitter for multiplexing a plurality of set of enhanced data encoded at different coding rates and main data and transmitting the multiplexed data.

Another object of the present invention is to provide an E8-VSB receiver for demultiplexing the received multiplexed main data and enhanced data being encoded at different coding rates.

Another object of the present invention is to provide a method for generating data attribute for multiplexing and demultiplexing a plurality of sets of enhanced data being encoded at different coding rates.

A further object of the present invention is to provide a method for performing bit interleaving taking into account map changes when generating data attribute for multiplexing and demultiplexing a plurality of sets of enhanced data being encoded at different coding rates.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an enhanced VSB transmitter according to the present invention includes a data attribute generator, a VSB pre-processor, a multiplexer, and a VSB processor. The data attribute generator generates data attribute information based on a current enhanced mode map. The VSB pre-processor codes first and second supplemental data for error correction, interleaves the coded supplemental data, and expands the interleaved first and second supplemental data at first and second rates, respectively, according to the data attribute information. The multiplexer multiplexes main data with the expanded first and second supplemental data according to the data attribute information. The VSB processor codes the data multiplexed by the first multiplexer for error correction.

In another aspect of the present invention, an enhanced VSB transmitter according to the present invention includes a data attribute generator, and a VSB pre-processor. The data attribute generator includes three attribute generators. A first attribute generator generates enhanced packet attribute information based on a current enhanced mode map, which indicates whether a supplemental data packet is to be expanded at a first and second rate. A second attribute generator generates enhanced byte attribute information which indicates whether each byte of the supplemental data packet is to be expanded at the first and second rate. A third attribute generator generates main and enhanced packet attribute information which indicates whether a data packet is a main data packet or an enhanced supplemental data packet.

The VSB pre-processor includes a multiplexer which multiplexes first and second supplemental data packets according to the enhanced packet attribute information, and a byte expander which expands each byte of the multiplexed first and second supplemental data packets according to the enhanced byte attribute information.

In another aspect of the present invention, an enhanced VSB receiver according to the present invention includes a tuner, a demodulator, a map information recovery unit, and a data attribute generator. The tuner selects a channel to receive a VSB signal which includes main data packets, first supplemental data packets expanded at a first rate, and second supplemental data packets expanded at a second rate. The demodulator demodulates the VSB signal, and the map information recovery unit recovers a current enhanced mode map from the demodulated VSB signal. The data attribute generator includes three attribute generators. A first attribute generator generates enhanced packet attribute information based on a current enhanced mode map, which indicates whether a supplemental data packet is to be expanded at a first and second rate. A second attribute generator generates enhanced byte attribute information which indicates whether each byte of the supplemental data packet is to be expanded at the first and second rate. A third attribute generator generates main and enhanced packet attribute information which indicates whether a data packet is a main data packet or an enhanced supplemental data packet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
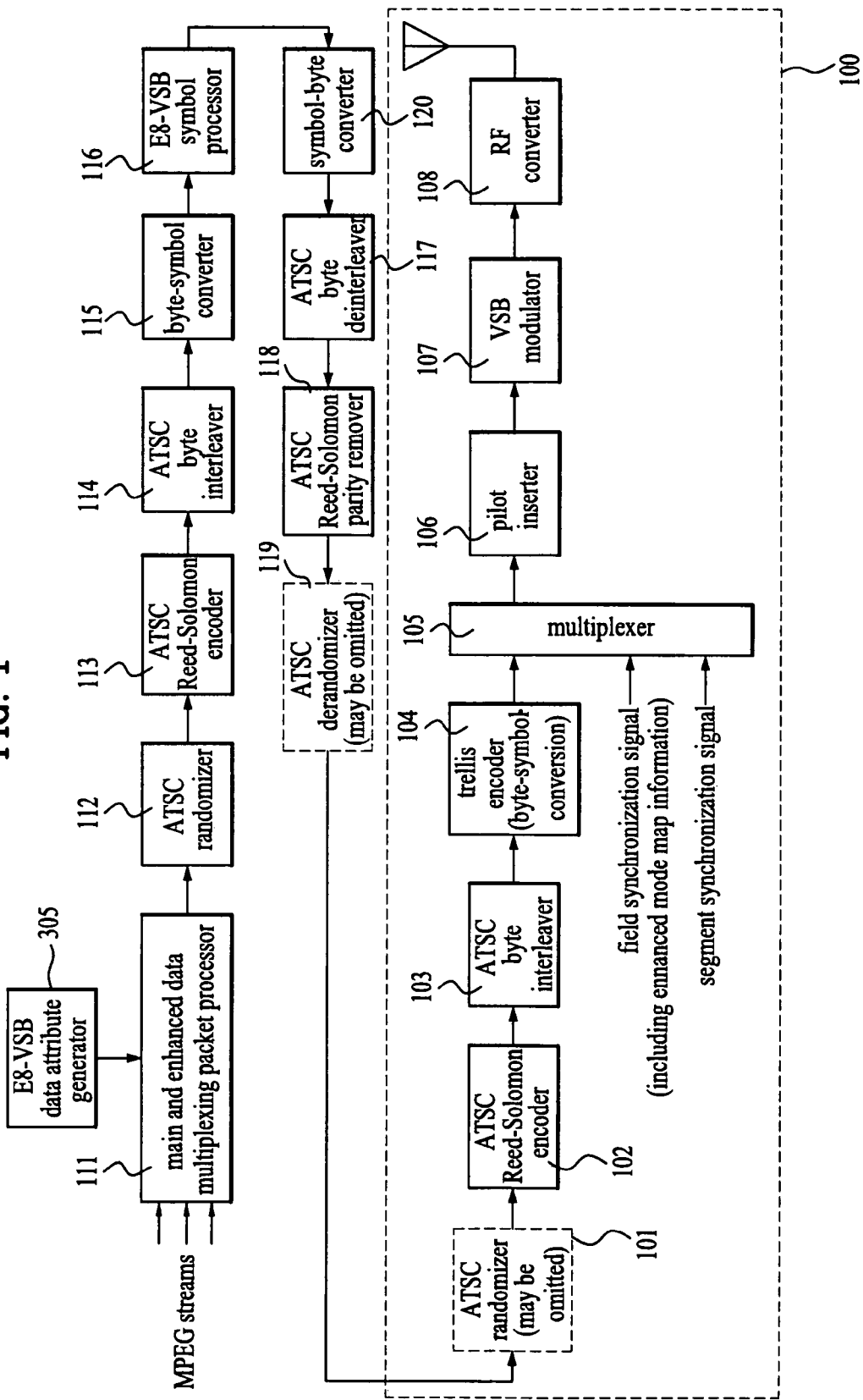
FIG. 1 illustrates a block view of an E8-VSB transmitting system according to an embodiment of the present invention.
Figure 7:
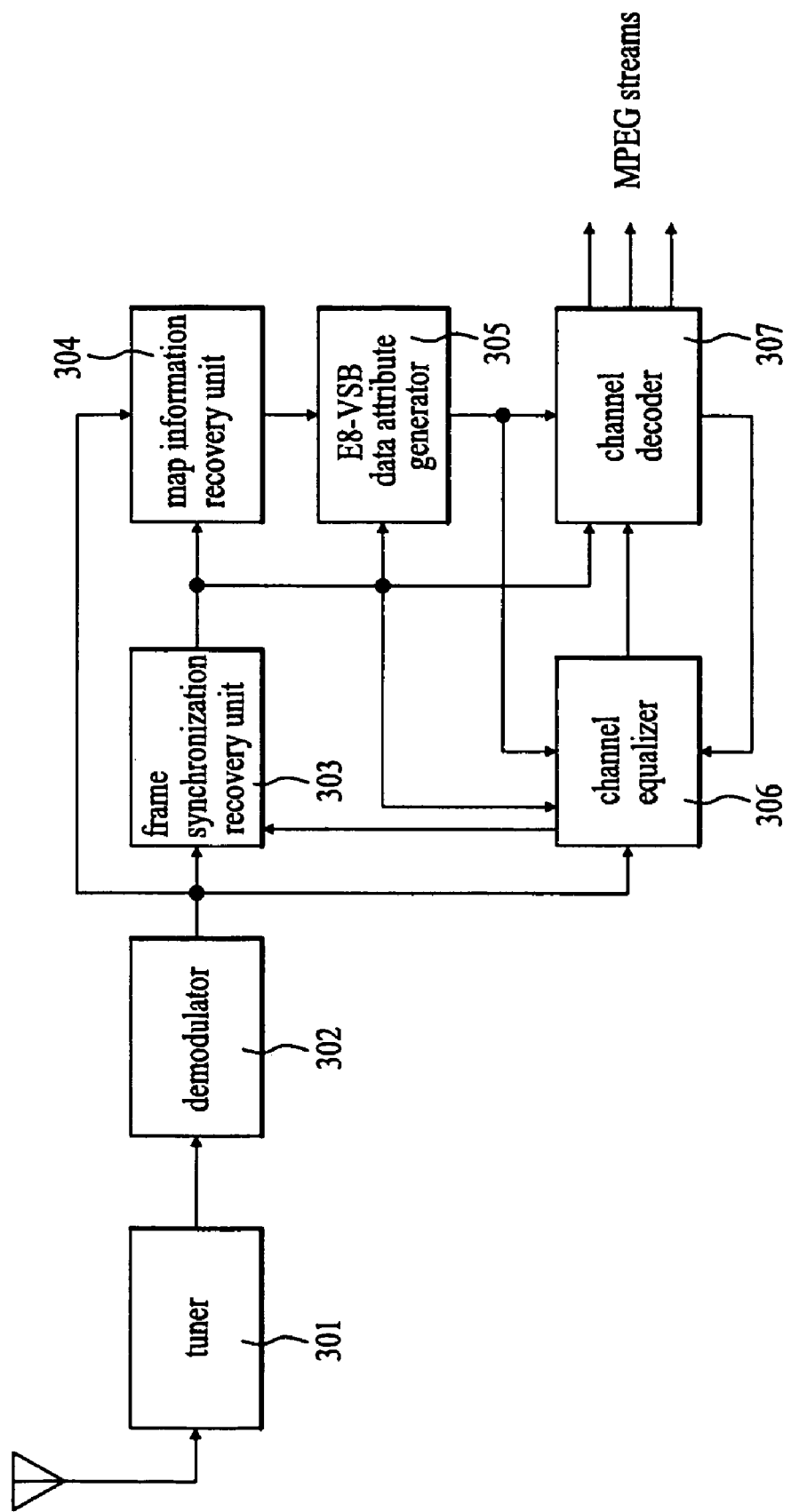
FIG. 7 illustrates a general view of an E8-VSB receiving system according to an embodiment of the present invention.

A general structure of a transmitter and a receiver that satisfy the above-described E8-VSB standard has already been disclosed by the applicant of the present invention. FIG. 1 illustrates a block view of an E8-VSB transmitting/receiving system according to an embodiment of the present invention, and FIG. 7 illustrates a general view of an E8-VSB receiving system according to an embodiment of the present invention. More specifically, the E8-VSB transmitting system may transmit MPEG-4 images, which are currently being used extensively, or other diverse additional data (i.e., program execution file, stock information, etc.). The E8-VSB transmitting system may also transmit MPEG-2 images and dolby audio data.

Hereinafter, the conventional MPEG-2 data will be referred to as "main data" or "main symbol" for simplicity of the description. Herein, the enhanced data may be additionally processed with error correction encoding as compared to the main data. Also, among the enhanced data (or enhanced symbol), a 1/2 enhanced data and a 1/4 enhanced data refer to data being additionally encoded at a 1/2 code rate and a 1/4 code rate, respectively. Therefore, such enhanced data can have an excellent reception performance over noise generated from channels and disturbance caused by multiple paths, as compared to the main data. More specifically, the enhanced data that is encoded at a 1/4 code rate (i.e., the 1/4 enhanced data) is more enhanced than the enhanced data that is encoded at a 1/2 code rate (i.e., the 1/2 enhanced data).

The general structure of the E8-VSB transmitting system according to the present invention will now be described with reference to FIG. 1. Referring to FIG. 1, a main and enhanced data multiplexing packet processor 111 receives a 1/2 enhanced data and a 1/4 enhanced data and performs pre-processing of the received enhanced data. After the E8-VSB pre-processing, the enhanced data and the main data are multiplexed to a packet unit of 188 bytes (i.e., a segment unit).

Figure 2:
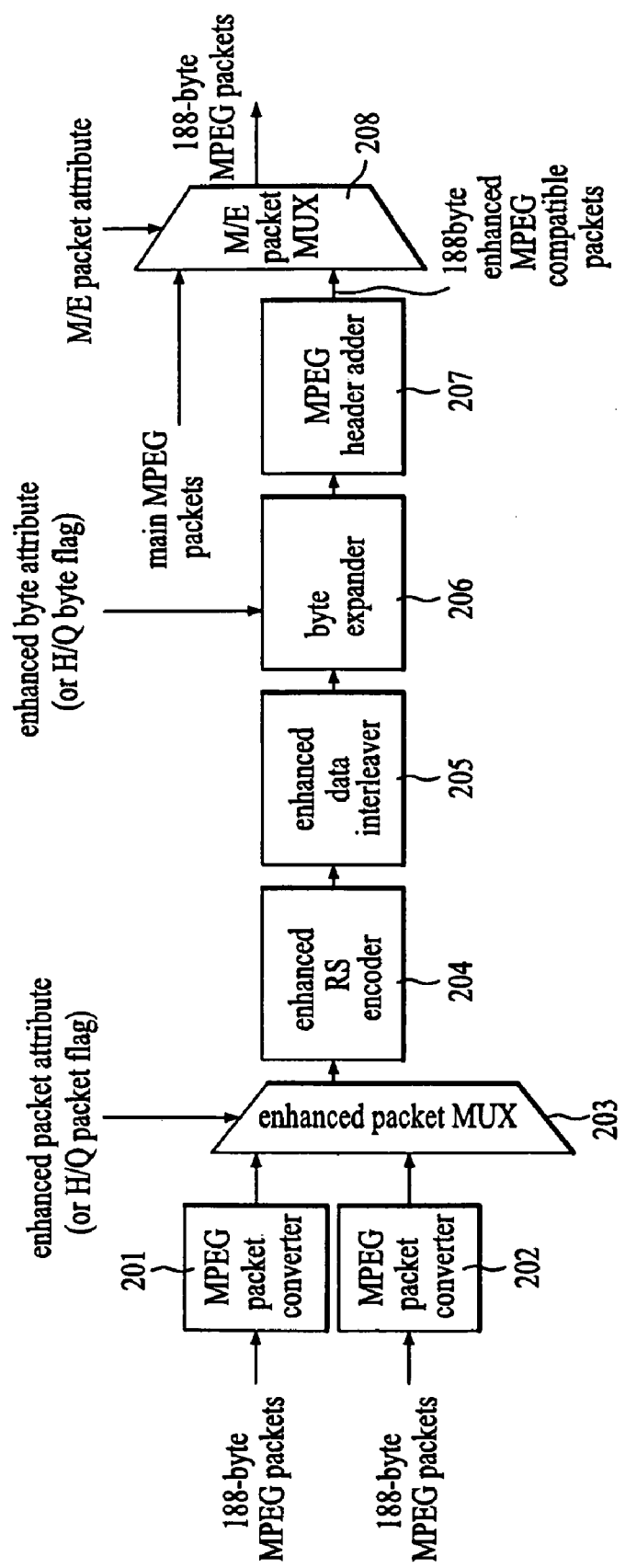
FIG. 2 illustrates a detailed block view of a main and enhanced multiplexing packet processor of FIG. 1.

FIG. 2 illustrates a detailed block view of the main and enhanced data multiplexing packet processor 111. More specifically, a first MPEG packet converter 201 divides the 1/2 enhanced data, which is inputted in a 188-byte packet unit, into 164-byte units without changing the data. The first MPEG converter 201 then outputs the divided 1/2 enhanced data to an enhanced packet multiplexer 203. A second MPEG converter 202 divides the 1/4 enhanced data, which is inputted in a 188-byte packet unit, into 164-byte units without changing the data. The second MPEG converter 202 then outputs the divided 1/4 enhanced data to the enhanced packet multiplexer 203. The enhanced packet multiplexer 203 multiplexes the 164-byte 1/2 enhanced data and 1/4 enhanced data, which are respectively outputted from the first and second MPEG packet converters 201 and 202, to packets of 164 bytes in accordance with an enhanced packet attribute information (or H/Q packet flag) and, then, outputs the multiplexed packets to an enhanced Reed-Solomon encoder 204. The enhanced packet attribute information indicates whether the packet that is currently being multiplexed from the enhanced packet multiplexer 203 is a packet transmitted in the 1/2 enhanced mode or a packet transmitted in the 1/4 enhanced mode.

The enhanced Reed-Solomon encoder 204 adds 20 bytes of parity signals to a set of enhanced data multiplexed from the enhanced packet multiplexer 203. Thus, the 1640 byte size enhanced data is converted to a 184-byte size packet, which is then outputted to an enhanced data interleaver 205. The enhanced data interleaver 205 performs convolutional interleaving of the enhanced data that is inputted from the enhanced Reed-Solomon decoder 204 in byte units in order to enhance its performance on burst noise and, then, outputs the enhanced data to a byte expander 206. The byte expander 206 expands the packet by inserting null bits corresponding to one of the 1/2 enhanced data and the 1/4 enhanced data that is outputted from the data interleaver 205 in accordance with an H/Q byte flag. More specifically, when 1 byte of the 1/2 enhanced data is inputted, the byte expander 206 adds (or inserts) a null bit between each bit, thereby expanding the byte to 2 bytes. And, when 1 byte of the 1/4 enhanced data is inputted, each bit is repeated once and the byte expander 206 adds (or inserts) a null bit between each bit, thereby expanding the byte to 4 bytes. The data expanded from the byte expander 206 is outputted to an MPEG header adder 207.

The MPEG header adder 207 adds 4 bytes of MPEG header to the beginning of each 184-byte unit of the enhanced data to which a null bit has been added in the byte expander 206, thereby creating a 188-byte unit MPEG converted packet. Then, the created packet is outputted to a Main/Enhanced (M/E) packet multiplexer 208. More specifically, 4 bytes of the main byte are added to 184 bytes of the enhanced bytes to create 188 bytes of the enhanced MPEG packet. The M/E packet multiplexer 208 multiplexes the main MPEG packet that is inputted in 188-byte unit and the enhanced MPEG packet, which is inputted from the MPEG header adder 207 in 188-byte unit, in accordance with the M/E packet attribute information, which are then outputted to an ATSC randomizer 112. The enhanced packet attribute information, the M/E packet attribute information, and the H/Q byte flag are all E8-VSB data attribute information created by using an enhanced mode map information (or E8-VSB map information) from an apparatus for generating data attribute. The apparatus for generating data attribute is included in both the E8-VSB transmitting system and receiving system, and the apparatus will be described in detail in a later process.

The ATSC randomizer 112 performs a randomizing process on 187 bytes of data, i.e., on the 188 bytes of the inputted MPEG data with the exception of the MPEG synchronization byte, which are then outputted to an ATSC Reed-Solomon (RS) encoder 113. The ATSC Reed-Solomon encoder 113 adds 20 bytes of parity for the 187 bytes of data, which are then outputted to an ATSC byte interleaver 114. The ATSC byte interleaver 114 interleaves the input data in byte unit, then, outputs the interleaved data to a byte-symbol converter 115. The byte-symbol converter 115 converts the data that is inputted in byte units into symbol units and performs a 12-way interleaving on the converted data, which is then outputted to an E8-VSB symbol processor 116. More specifically, each 2 bits of one byte are converted to 4 symbols, which are then interleaved to symbol units. The E8-VSB symbol processor 116 performs convolutionl encoding only on the symbol unit enhanced data and outputs the convolutionally encoded data to a symbol-byte converter 120 which has the inverse process of the byte-symbol converter 115. The symbol-byte converter 120 outputs the byte unit data to an ATSC byte deinterleaver 117. The ATSC byte deinterleaver 117 deinterleaves the data inputted in symbol units as an inverse process of the interleaving process. Then, the ATSC byte deinterleaver 117 outputs the deinterleaved data to an ATSC Reed-Solomon (RS) parity remover 118. The ATSC Reed-Solomon (RS) parity remover 118 removes the 20 bytes of parity that has been added in the ATSC RS encoder 113 from the deinterleaved data and outputs the parity-removed data to an 8VSB transmitter 100.

The 8VSB transmitter 100 has the same structure as that of the related art ATSC 8VSB transmitting system. More specifically, the 8VSB transmitter 100 includes an ATSC randomizer 101 (may be omitted), an ATSC Reed-Solomon encoder 102, an ATSC byte interleaver 103, a trellis encoder 104, a multiplexer 105, a pilot inserter 106, a VSB modulator 107, and an RF converter 108. More specifically, the parity-removed data from the ATSC RS parity remover 118 passes through the ATSC Reed-Solomon encoder 102 and the ATSC byte interleaver 103, thereby performing Reed-Solomon encoding, wherein 20 bytes of parity signals are added to the data, and data interleaving, wherein the order of data is changed. In addition, the interleaved data is trellis encoded by the trellis encoder 104, and then the trellis encoded data is inputted to the multiplexer 105. The multiplexer 105 multiplexes the trellis encoded symbol column, field synchronization signal, segment synchronization signal, and enhanced mode map information. The pilot inserter 106 inserts (or adds) a pilot signal to the multiplexed symbol column, signals, and map information, which are then outputted to the VSB modulator 107. The VSB modulator 107 modulates the inserted signal to an 8VSB signal of an intermediate frequency bandwidth and outputs the modulated signal to the RF converter 108. The RF converter converts the VSB-converted signal to a Radio Frequency (RF) signal and transmits the RF signal to an antenna.

The Enhanced Mode Map

The method of multiplexing the 1/2 enhanced data packet, the 1/4 enhanced data packet, and the main data packet to a VSB field from the enhanced packet multiplexer 203 and the M/E packet multiplexer 208 and the amount of data that is to be multiplexed are decided in accordance with the enhanced mode map. The enhanced mode map is included in a reserved area within a field synchronization segment and transmitted to a receiver. One enhanced mode map is transmitted in over two fields. More specifically, the enhanced mode map is formed of a total of 24 bits, which are divided into two sets of 12 bits. Each set of 12 bits is Kerdock encoded (64, 12) to create a set of 64 bits. The Kerdock encoded enhanced mode map is then included in a reserved area of a field synchronization segment of both an odd field and an even field. In the E8-VSB transmitting system, one data frame is formed of an odd field and an even field, which is identical to the conventional ATSC 8VSB transmitting system.

A current MAP, which is currently being used, is transmitted to the odd field, and a next MAP, which is to be used in a later process, is transmitted to the even field. In addition, 4 bits of data frame counter starting from the current MAP until the MAP is changed to the next MAP are each divided into 2 bits, which are transmitted from the even and odd fields. Each of the current MAP and the next MAP are formed of 10 bits. The 10 bits include information on the number of segments (or 188-byte packets) of the 1/2 enhanced data and the 1/4 enhanced data, which are multiplexed in one data field, and information on the multiplexing method. A MAP may be changed after each $16^{th}$ data frame. If the MAP is not changed, the data frame counter value is maintained at '15'. In this case, the current MAP and the next MAP are identical to one another.

Problems that May Occur During a Map Change

The enhanced data packet, which is multiplexed in 164-byte units from the enhanced packet multiplexer 203, is RS encoded by the enhanced RS encoder 204 and changed to a 184-byte unit packet. Therefore, the number of 1/2 enhanced bytes and the number of 1/4 enhanced bytes that are inputted to the enhanced data interleaver 205 are 184*H and 184*Q, respectively. Herein, the number of 1/2 enhanced data packets (i.e., 164 bytes) and the number of 1/4 enhanced data packets (i.e., 164 bytes) that are multiplexed in one VSB data field are defined as H and Q, respectively. If the MAP is not changed and the 1/2 enhanced packet and the 1/4 enhanced packet are multiplexed by constant H and Q values in each field, the number of 1/2 enhanced bytes and the number of 1/4 enhanced bytes, which are outputted from the enhanced data interleaver 205, also become 184*H and 184*Q, respectively.

When such interleaved data pass through the byte expander 206, one 1/2 enhanced byte is expanded to two (2) bytes, and one 1/4 enhanced byte is expanded to four (4) bytes. Therefore, the total number of enhanced bytes being outputted from each data field is equal to (2*184*H+4*184*Q) bytes. Subsequently, the MPEG header adder 207 inserts (or adds) four (4) bytes to each 184 bytes of the output transmitted from the byte expander 206. Then, the MPEG header adder 207 outputs a 188-byte enhanced packet. Therefore, (2*H+4*Q) number of segments (or 188-byte packet) for each data field are outputted to the M/E packet multiplexer 208 so as to be multiplexed with the main data segment.

Figure 3:
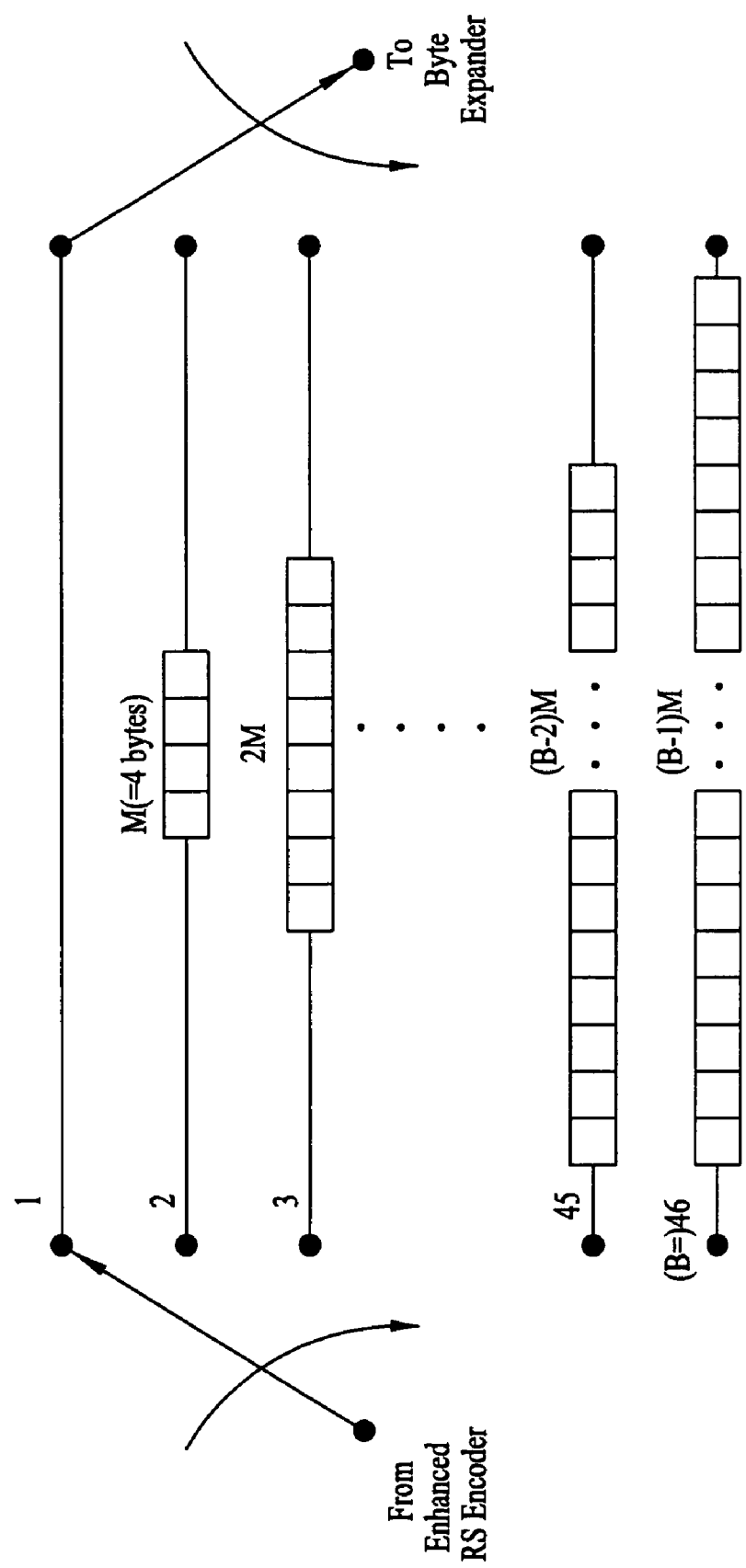
FIG. 3 illustrates a detailed block view of an enhanced data interleaver of FIG. 2.

FIG. 3 describes the enhanced data interleaver 205 of FIG. 2 in detail. The enhanced data interleaver 205 is a convolutional interleaver having 46 branches (B) and a basic memory size (M) of 4 bytes. The enhanced data interleaver 205 is operated in byte units. More specifically, each time a byte in inputted to the enhanced data interleaver 205 from the enhanced RS encoder 204, a branch is sequentially selected so as to output one byte containing the contents of the input byte or the memory of the interleaver. Therefore, the enhanced data interleaver 205 receives a 184-byte packet from the enhanced RS encoder 204. Then, each of the 46 branches of the enhanced data interleaver 205 is repeated 4 times, thereby outputting 184 interleaved bytes.

When the number of multiplexed enhanced packets is changed during broadcasting, the values pf H and Q are changed from (H1, Q1) to (H2, Q2), respectively. At this point, the enhanced data interleaver 205 not only changes the order of the data existing within the same data field, but also outputs bytes of the previous data field as well as the data of the newly changed data field for a set period of time even after the data field has been changed. Therefore, when the MAP is changed, the data of the current MAP and the data of the next MAP are both included in the output of the enhanced data interleaver 205.

Figure 4:
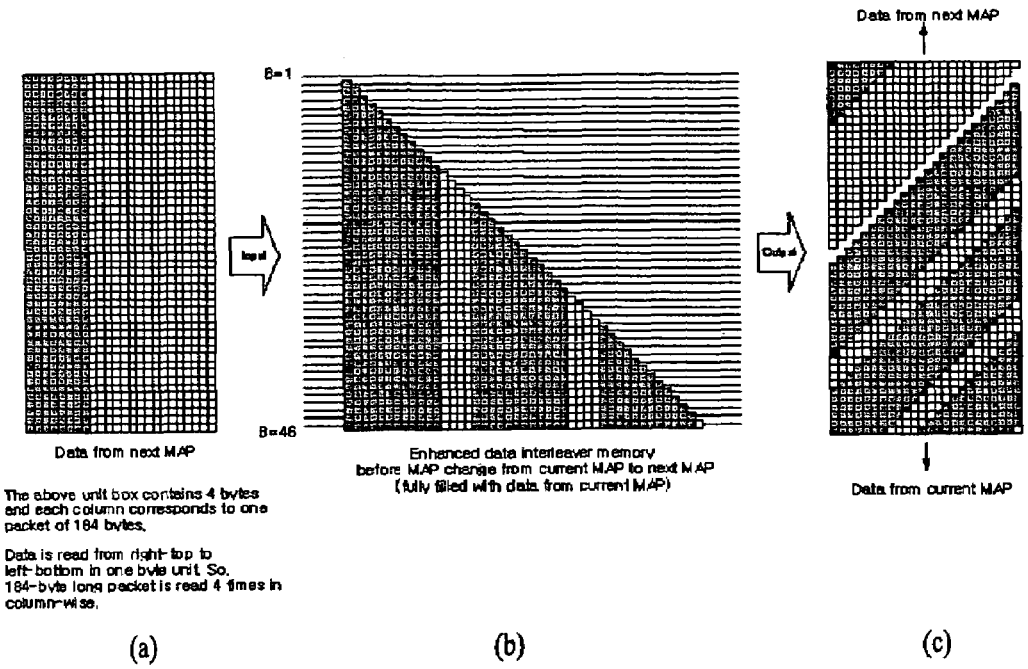
FIG. 4 to FIG. 6 illustrate process steps of MAP change from a current MAP to a next MAP according to the present invention.
Figure 5:
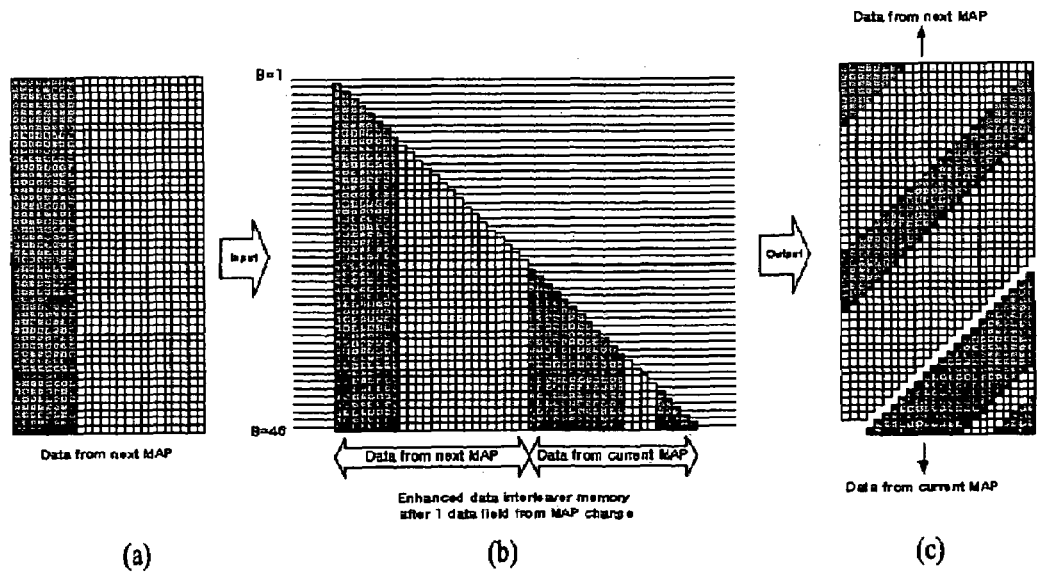
Figure 6:
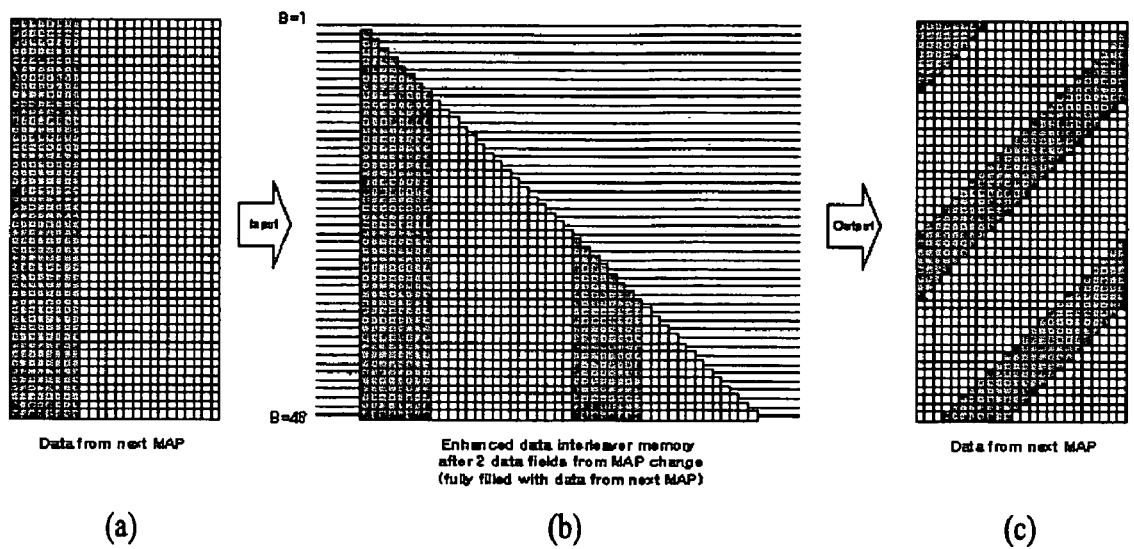

FIG. 4 to FIG. 6 illustrate examples of the current MAP being changes to the next MAP. In the above-described example, the number of 1/2 enhanced packets and the number 1/4 enhanced packets in the current MAP are 4 and 12, respectively (i.e., H1=4, Q1=12). In the next MAP, the number of 1/2 enhanced packets and the number 1/4 enhanced packets are 16 and 8, respectively (i.e., H2=16, Q2=8). The example of grouping and multiplexing the 1/2 enhanced packets and the 1/4 enhanced packets from the enhanced packet multiplexer 203 of FIG. 2 is described herein. Referring to FIG. 4 to FIG. 6, black indicates the 1/4 enhanced bytes and white indicates the 1/2 enhanced bytes.

FIG. 4 describes a situation where the enhanced data is processed and transmitted in the current MAP up to the previous data field and the MAP is changed to the next MAP at the current data field. FIG. 4(b) illustrates a memory state of the enhanced data interleaver 205 prior to receiving the output of the enhanced RS encoder 204 corresponding to the current data field. More specifically, in FIG. 4(b), the memory of the enhanced data interleaver 205 is filled with data corresponding to the current MAP. Furthermore, in FIG. 4(b), the memory of the enhanced data interleaver 205 is described by 4-byte units for simplicity. FIG. 4(a) illustrates a set of data being treated and outputted from the enhanced packet multiplexer 203 and the enhanced RS encoder 204 in accordance with the next MAP and, then, being inputted to the enhanced data interleaver 205. Herein, the unit block is also described by 4-byte units. The bytes existing in the same block are inputted to the same branch of the enhanced data interleaver 205. Moreover, each column has 46 unit blocks, which indicates that one packet is equal to 184 bytes.

FIG. 4(a) represents a set of enhanced data corresponding to one data field. Herein, each byte is inputted (or read) one-by-one to the enhanced data interleaver 205 starting from the right-top to the left-bottom. Accordingly, one packet (i.e., one column) is inputted to the enhanced data interleaver 205 as 46 branches are selected 4 times. FIG. 4(c) illustrates a set of data that is outputted when all the data of FIG. 4(a) is inputted to the memory state of the enhanced data interleaver 205 FIG. 4(b). FIG. 4(c) is also outputted starting from the right-top to the left-bottom, which is the same as FIG. 4(a). As shown in FIG. 4(c), the data outputted from the enhanced data interleaver 205 includes both the data of the previous field (i.e., data corresponding to the current MAP) and the data of the current field (i.e., data corresponding to the next MAP).

In the input data of FIG. 4(a), since (H2=16 and Q2=8), the number of 1/2 enhanced bytes and the number of 1/4 enhanced bytes are 2944(=16*46*4) and 1472(=8*46*4), respectively. On the other hand, in the output data of FIG. 4(c), the number of 1/2 enhanced bytes and the number of 1/4 enhanced bytes are 1692(=423*4) and 2724(=681*4), respectively. In other words, the total number of bytes inputted to the enhanced data interleaver 205 (i.e., 2944+1472=4416) is identical to the total number of outputted bytes (i.e., 1692+2724=4416). However, the total number of input bytes (i.e., 2944) and the total number of the output bytes (i.e., 1692) of the 1/2 enhanced bytes are not identical to one another. And, similarly, the total number of input bytes (i.e., 1472) and the total number of the output bytes (i.e., 2724) of the 1/4 enhanced bytes are also not identical to one another. In this case, when the output of the enhanced data interleaver 205 is expanded from the byte expander 206 in accordance with the attribute (i.e., one of the 1/2 enhanced byte and the 1/4 enhanced byte) of the input, the total number of input bytes becomes equal to 14280(=1692*2+2724*4).

However, since the number of segments allocated from the M/E packet multiplexer 208 to the enhanced data is equal to 64(=16*2+8*4), the total number of bytes that are to be outputted from the byte expander 206 is equal to 11776(=64*184). Therefore, a mismatch may occur between the amount of data being allocated to the enhanced data by the M/E packet multiplexer 208 and the amount of data being byte-expanded and outputted from the MPEG header adder 207. In the above-described example, the amount of data being allocated to the enhanced data by the M/E packet multiplexer 208 is equal to 14280 bytes. On the other hand, the amount of data being byte-expanded and outputted from the MPEG header adder 207 is equal to 11776 bytes.

FIG. 5 illustrates a status of the memory of the enhanced data interleaver after one data field after a MAP change has occurred. More specifically, FIG. 5(b) illustrates a memory state of the enhanced data interleaver 205 after one data field after the MAP change has occurred. In other words, when data corresponding to the next MAP, as shown in FIG. 4(a) is inputted to the memory state of the enhanced data interleaver 205 shown in FIG. 4(b), the memory of the enhanced data interleaver 205 is changed to the status shown in FIG. 5(b). On the other hand, when a set of enhanced data of the next MAP corresponding to one data field, as shown in FIG. 5(a), is inputted to the memory state of the enhanced data interleaver 205, shown in FIG. 5(b), the data shown in FIG. 5(c) is outputted from the enhanced data interleaver 205.

Referring to FIG. 5, since both the data of the current MAP and the data of the next MAP exist within the memory of the enhanced data interleaver 205, data of the current MAP and data of the next MAP may be outputted in combination, as shown in FIG. 5(c), from the enhanced data interleaver 205, even when data is inputted to the next MAP. More specifically, in case of FIG. 5, the number of 1/2 enhanced bytes and the number of 1/4 enhanced bytes included in the data that is inputted, as shown in FIG. 5(a), are 2944(=16*46*4) and 1472(=8*46*4), respectively. Conversely, the number of 1/2 enhanced bytes and the number of 1/4 enhanced bytes included in the output data shown in FIG. 5(c) are 2700 (=675*4) and 1716(=429*4), respectively. Therefore, a mismatch may occur between the amount of data being allocated to the enhanced data by the M/E packet multiplexer 208 and the amount of data being byte-expanded and outputted from the MPEG header adder 207, which is identical to the instance described in FIG. 4.

FIG. 6 illustrates a status of the memory of the enhanced data interleaver after two data fields after a MAP change has occurred. More specifically, when data corresponding to the next MAP, as shown in FIG. 5(a) is inputted to the memory state of the enhanced data interleaver 205 shown in FIG. 5(b), the memory of the enhanced data interleaver 205 is changed to the status shown in FIG. 6(b). Referring to FIG. 6(b), since the memory of the enhanced data interleaver 205 is filled with data from the next MAP, when data of the next MAP is inputted, as shown in FIG. 6(a), all the data from the next MAP is outputted, as shown in FIG. 6(c). Therefore, in this case, the number of 1/2 enhanced bytes and the number of 1/4 enhanced bytes outputted from the enhanced data interleaver 205 are 2944(=16*46*4) and 1472(=8*46*4), respectively, which indicates that the input and the output are identical to one another. Furthermore, in this case, the amount of data being allocated to the enhanced data by the M/E packet multiplexer 208 and the amount of data being byte-expanded and outputted from the MPEG header adder 207 are also identical to one another.

As described in FIG. 4 to FIG. 6, the period corresponding to the two data fields after the MAP change becomes a transitional period, wherein a mismatch may occur between the amount of data being allocated to the enhanced data by the M/E packet multiplexer 208 and the amount of data being byte-expanded and outputted from the MPEG header adder 207. However, after the two data fields, the memory of the enhanced data interleaver 205 is filled with data from the next MAP. Therefore, the amount of data being allocated to the enhanced data by the M/E packet multiplexer 208 and the amount of data being byte-expanded and outputted from the MPEG header adder 207 are always identical to one another.

The above-described transitional period is identical to the time required for the data of the next MAP to fill the memory of the enhanced data interleaver 205. And, this specific time may vary depending upon the number of 1/2 enhanced packets and the number of 1/4 enhanced packets that are multiplexed from the next MAP. In other words, when H represents the number of 1/2 enhanced packets being multiplexed for each data field from the next MAP, and when Q represents the number of 1/4 enhanced packets being multiplexed for each data field from the next MAP, the time of the transitional period (i.e., the transient time) can be described in field units as shown in Equation 1 below:

$$\text{transient time} = \text{round}(45/(H+Q)), \quad \text{[Equation 1]}$$

wherein the round( ) function indicates "round up to the nearest integer value".

Even if the current MAP is changed to the next Map in the enhanced packet multiplexer 203, both the data of the current MAP and the data of the next MAP are included in the output of the enhanced data interleaver 205, until the memory of the enhanced data interleaver 205 is filled with the data of the next MAP. Therefore, during the transitional period, the number of inputted 1/2 enhanced bytes and the number of outputted 1/2 enhanced bytes of the enhanced data interleaver 205 in one data field are different from one another. Moreover, the number of inputted 1/4 enhanced bytes and the number of outputted 1/4 enhanced bytes of the enhanced data interleaver 205 in one data field are also different from one another. Furthermore, since the 1/2 enhanced bytes and the 1/4 enhanced bytes are expanded by the byte expander 206 at a different expansion rate, a mismatch may occur between the amount of data prepared from the M/E packet multiplexer 208 for the enhanced data and the amount of data being outputted from the MPEG header adder 207.

E8-VSB Transmitting/Receiving System Capable of Changing the MAP Without Damaging the Enhanced Data The present invention relates to an E8-VSB transmitting/receiving system that can change a MAP without causing damage to the enhanced data. Most particularly, the present invention relates to providing an E8-VSB transmitting/receiving system that is capable of changing the MAP without damaging the enhanced data, when interleaving the enhanced data in order to generate byte attributes.

FIG. 7 illustrates an example of the E8-VSB receiving system according to the present invention having an E8-VSB data attribute generating device applied thereto. Referring to FIG. 7, when E8-VSB converted RF signals are received through an antenna, a tuner 301 selects only the RF signal of a desired channel by tuning the received signals. Then, the tuner 301 converts the selected RF signal to an IF signal and transmits the IF signal to a demodulator 302. The demodulator 302 performs VSB demodulation, such as AGC, A/D conversion, carrier wave recovery, timing recovery, and so on, on the IF signal, thereby transmitting the treated IF signal to a frame synchronization recovery unit 303, a MAP information recovery unit 304, and a channel equalizer 306.

The frame synchronization recovery unit 303 detects a field synchronization signal and a segment synchronization signal from the output of the demodulator 302 and/or the output of the channel equalizer 306. Then, the frame synchronization recovery unit 303 transmits the extracted signal to the MAP information recovery unit 304, an E8-VSB data attribute generator 305, the channel equalizer 306, and a channel decoder 307. The MAP information recovery unit 304 recovers the enhanced mode MAP information of the current field transmitted from the output of the demodulator 302 and/or the output of the channel equalizer 306. Then, the MAP information recovery unit 304 supplies the recovered information to the E8-VSB attribute generator 305. The enhanced mode MAP information includes information on how the main data, the 1/2 enhanced data, and the 1/4 enhanced data have been multiplexed.

Figure 8:
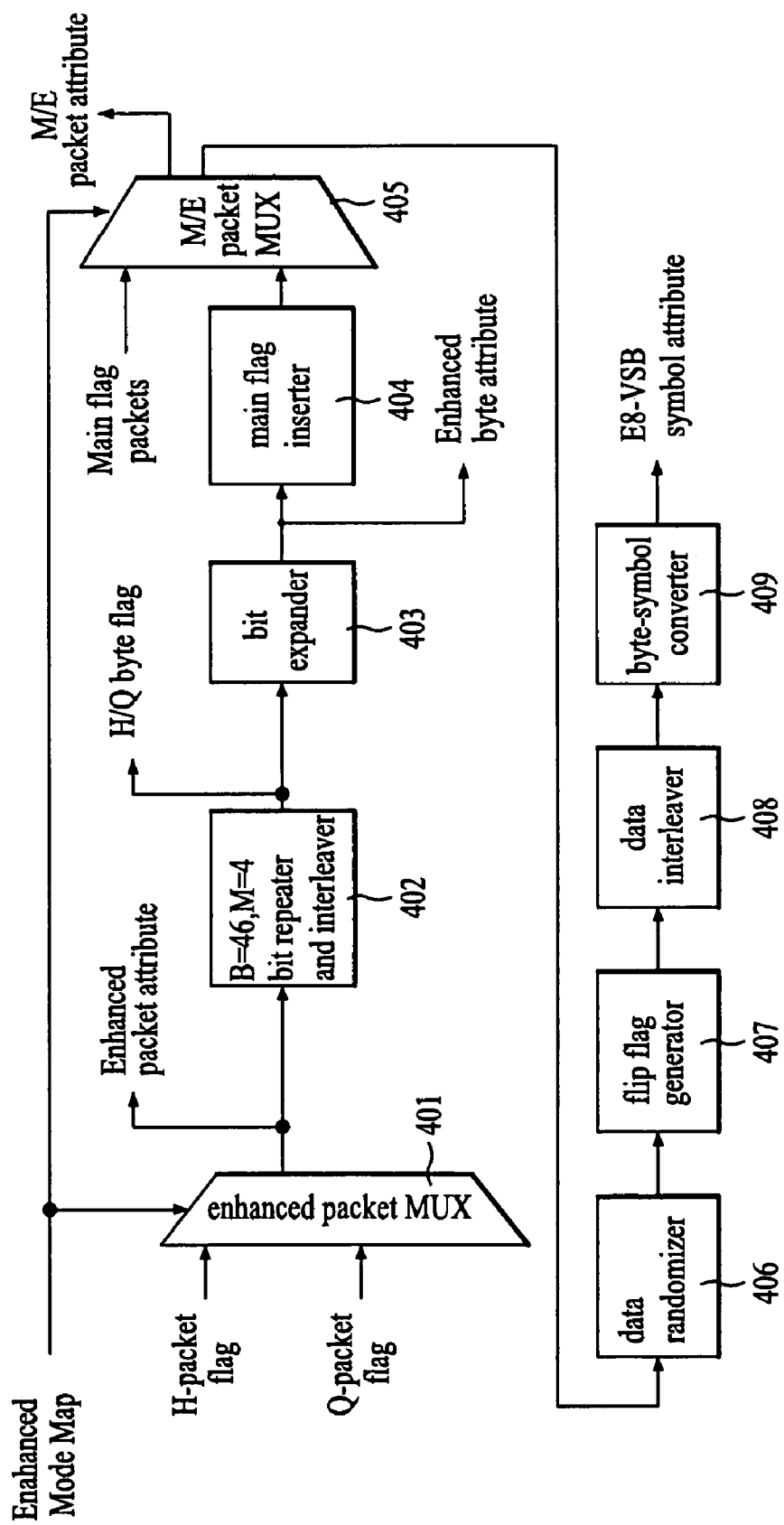
FIG. 8 illustrates a detailed block view of a data a data attribute generator.

The E8-VSB data attribute generator 305 generates the attribute information of the current E8-VSB data, which designates the attribute for each data of the E8-VSB signal by using the field synchronization signal and the enhanced mode MAP information of the current field, as shown in FIG. 8. The E8-VSB data is divided into a symbol unit, two byte units, two packet units and requires an attribute for each unit. At this point, the E8-VSB data attribute generator 305 provides the attribute information of the current VSB symbol to the channel equalizer 306 and the channel decoder 307. Accordingly, the channel equalizer 306 may perform enhanced equalization, and the channel decoder 307 may perform channel decoding that is suitable for the currently received mode.

More specifically, the channel equalizer 306 receives the decision value of the channel decoder 307 and a symbol attribute information of the E8-VSB data attribute generator 305. Then, the channel equalizer 306 compensates for the channel distortion included in the VSB demodulated signal. Thereafter, the channel equalizer 306 transmits the compensated information to the channel decoder 307. The channel decoder 307 receives the E8-VSB symbol attribute information notifying the multiplexing information of the currently received E8-VSB signal transmitted from the E8-VSB data attribute generator 305 and, then, decodes the channel equalized signal to the corresponding mode (i.e., main MPEG packets, enhanced 1/2 MPEG packets, and enhanced 1/4 MPEG packets).

FIG. 8 illustrates an apparatus for generating E8-VSB data attribute that is used in the E8-VSB transmitting and receiving system according to the present invention. Referring to FIG. 8, an enhanced packet attribute information transmitted from an enhanced packet multiplexer 401 is an attribute information that indicates whether the current enhanced packet is a 1/2 enhanced packet or a 1/4 enhanced packet. The attribute information is used as a control signal by the enhanced packet multiplexer 203 of the E8-VSB transmitting system shown in FIG. 2. The enhanced packet attribute information is also used by the E8-VSB receiving system in order to demultiplex the 164-byte enhanced packet to a 1/2 enhanced packet and a 1/4 enhanced packet.

The H/Q byte flag outputted from the beat repeating and interleaving unit 402 represents information indicating whether a current enhanced byte is a 1/2 enhanced byte or 1/4 enhanced byte. This flag is used as a control signal by the byte expander 206 of the E8-VSB transmission system. More specifically, the H/Q byte flag indicates attribute information of the data outputted from the data interleaver 205 shown in FIG. 2. In addition, the enhanced byte attribute information outputted from the bit expander 403 represents attribute information of the data outputted from the byte expander 206. Namely, it is determined whether the data byte inputted into the null bit remover in the E8-VSB reception system represent 1/2 enhanced byte or 1/4 enhanced byte, and the repeated bits and null bits are removed from the data byte using the enhanced byte attribute information.

At this point, when the bit repeater and interleaver 402 generates an H/Q byte flag, the above-described transition does not occur, even when a MAP change from a current MAP to a next MAP occurs. Instead, a memory of the bit repeater and interleaver 402 is initialized and operated as though the data of the next MAP is written in all of the memory of the enhanced data interleaver 203, thereby preventing the mismatch of the data amount that may occur in the above-described transition. However, by doing so, the actual 1/2 enhanced byte may be mis-identifed as a 1/4 enhanced byte within the transition area (or period), which may eventually cause a byte expansion from the byte expander 206, and vice versa. After the transition area, the actual byte attribute of the enhanced data and the enhanced byte attribute of the bit repeater and interleaver 402 are always identical to one another.

Therefore, according to the present invention, by initializing the memory of the bit repeater and interleaver 402 to a state where the data of the next MAP is written in all of the entire memory (in other words, initializing the memory by writing the data of the next MAP in the entire memory), before the MAP change from the current MAP to the next MAP occurs, the MAP may be changed without any damage or loss in the enhanced data. At this point, the memory of the bit repeater and interleaver 402 is initialized during the field synchronization section immediately before the MAP is changed from the current MAP to the next MAP. Furthermore, such initialization of the memory of the bit repeater and interleaver 402 is identically applied to the E8-VSB transmitting system and the E8-VSB receiving system.

Embodiment of the Bit Repeater and Interleaver 402

According to the variables B(=46) and M(=4) of the interleaver, the bit repeater and interleaver 402 requires memory elements of at least 4*45*(45+1)/2=4140 bits. And, the time required for filling the memory elements with 4140 bits of attribute information, in order to initialize the memory elements when the MAP is changed, is corresponds to at least 4140 clocks. Furthermore, each time the MAP is changed, the memory element value is initialized to the attribute information of the next MAP before the MAP changes from the current MAP to the next MAP. However, as shown in the memory state of the enhanced data interleaver 203 of FIG. 4 to FIG. 6, one column (i.e., one enhanced packet) of the memory has the same attribute. This is because all of the 184 bytes of the packet that is outputted from the enhanced RS encoder 204 have the same byte attribute. Accordingly, this means that each one packet requires one attribute.

Therefore, one bit may be allocated for each column (i.e., one enhanced packet) when forming the bit repeater and interleaver 402 shown in FIG. 8, instead of allocating one bit to each byte. This signifies that the number of memory devices required for the interleaver have decreased remarkably from 4140 bits to 45 bits, which is also advantageous for the initialization process. More specifically, 4140 clocks were originally required for initializing the memory of the bit repeater and interleaver 402. However, by configuring the memory elements in packet units, initialization can be performed on only 45 bits. In other words, since the initialization is performed only on 45 clocks, initialization of the memory of the bit repeater and interleaver 402 may be completed during the field synchronization section.

Figure 9:
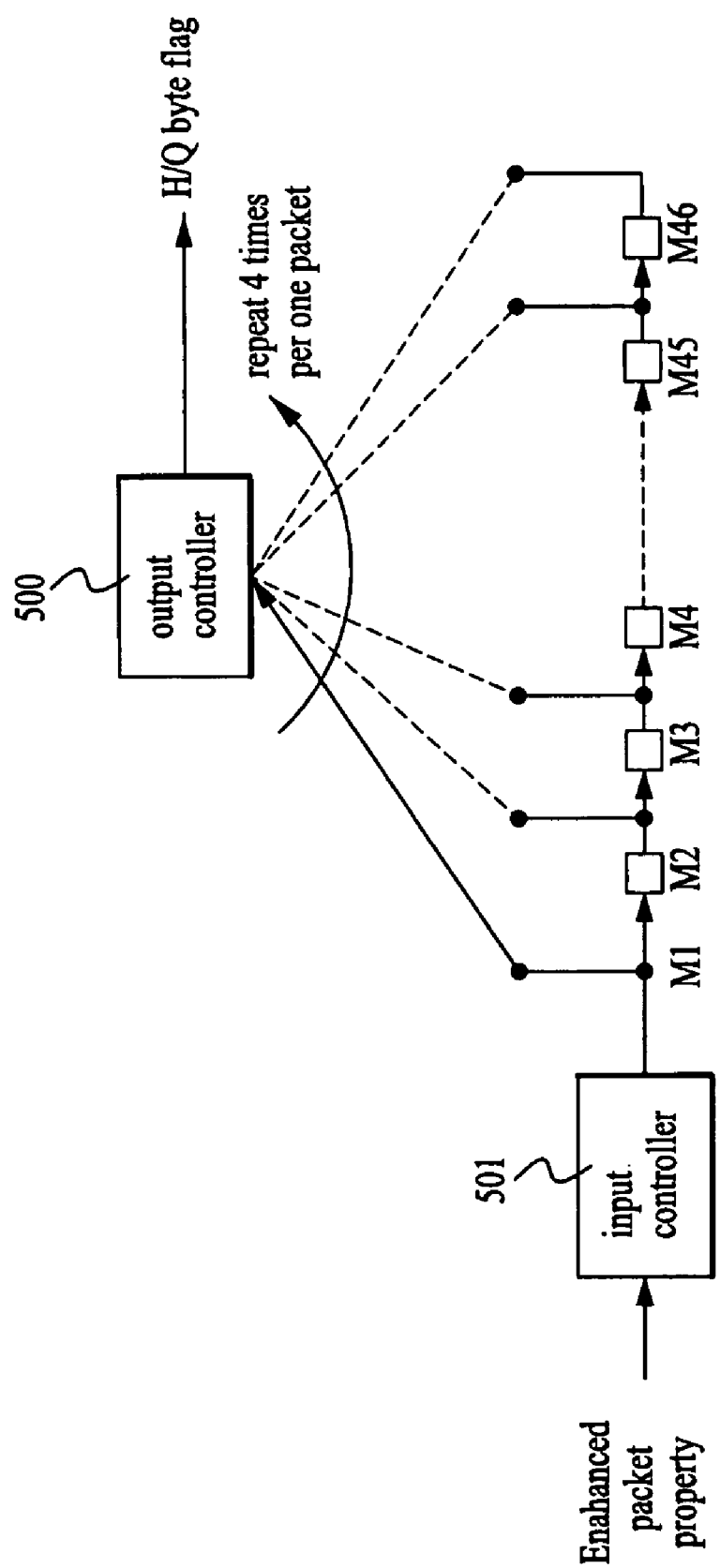
FIG. 9 illustrates a detailed block view of a bit repeating and interleaving unit according to the present invention.

FIG. 9 illustrates an exemplary embodiment of the bit repeater and interleaver 402. First of all, the memory elements (M2~M46) that are formed of 45 bit units are aligned in series. An output controller 500 is connected to an input terminal (M1) and output terminals of each of the memory elements (M2~M46). An input controller 501 is connected to the fore end of the input terminal (M1). Herein, the output controller 500 serially receives an enhanced packet attribute information from each terminal and transmits (or outputs) an H/Q byte flag of 184 bits for each enhanced packet. The input controller 501 generates an enhanced packet attribute needed for the initialization and selects one of the generated enhanced packet attribute and the inputted enhanced packet attribute. The enhanced packet attribute information transmitted from the enhanced packet multiplexer 401 is provided to the input terminal (M1) through the input controller 501.

More specifically, when performing a general operation and not the initialization operation, the attribute information (i.e., the value indicating whether the enhanced packet is a 1/2 enhanced packet or a 1/4 enhanced packet) for an enhanced packet is inputted to the bit repeater and interleaver 402 from the enhanced packet multiplexer 401. Then, an attribute value for each enhanced byte that is stored in (or remembered by) the input terminal (M1) and each memory element (M2~M46) is serially outputted to the output controller 500. The output controller 500 serially outputs each of the attribute values. This process is repeated four times, thereby outputting (or generating) the H/Q byte flag of 184 bits. Thereafter, the value of the M45 memory element is moved (or transferred) to the M46 memory element, the value of the M44 memory element to the M45 memory element, . . . , and the value of the M1 memory element to the M2 memory element, so that the attribute information of the next enhanced packet is inputted to the M1 memory element from the enhanced packet multiplexer 401.

When a MAP change occurs, the input controller 501 creates and outputs 45 enhanced packet attributes corresponding to the next MAP, so that the value of the memory element of the bit repeater and interleaver 402 can be initialized to a state where all the attribute information of the next MAP is written in the interleaver memory during the field synchronization segment time immediately before the current MAP is changed to the next MAP. And, in the data area, the enhanced packet attribute received from the enhanced packet multiplexer 401 transmitted as it is and then interleaved. Therefore, a MAP may be changed without causing any loss or damage in the enhanced data. The subsequent process is identical to the process described in the above-mentioned patent application (KR No. 10-2004-0096358), and the description of the same will, therefore, be omitted for simplicity.

The above-described enhanced VSB transmitter and receiver according to the present invention have the following advantages. When changing a MAP from a current MAP to a next MAP, initializing the memory of the bit repeater and interleaver for generating data attribute to a state when the data of the next MAP is written in the entire memory immediately before the enhanced data is inputted to the enhanced byte interleaver, the MAP may be changed without loss or damage in the enhanced data. Furthermore, by configuring the memory of the bit repeater and interleaver to have a structure of allocating on bit for each enhanced packet, the size of the memory can be minimized and the time required for initializing the memory can also be reduced.

The terminologies used in the description of the present invention have been defined by taking into consideration the functions of the present invention. Thus, the meaning may be changed in accordance with the intentions or usual practice of someone skilled in the art. Therefore, the terminologies should be defined based upon the overall contents of the description of the present invention. It will be apparent that the present invention is not limited to the embodiments proposed herein. It will also be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A transmitter comprising:
    a data attribute generator for generating data attribute information based on a current enhanced mode map, the data attribute generator comprising a bit repeating and interleaving unit having a plurality of memory elements;
    a pre-processor for coding first and second supplemental data for error correction, interleaving the coded first and second supplemental data, and expanding the interleaved first and second supplemental data at first and second rates, respectively, according to the data attribute information;
    a first multiplexer for multiplexing main data with the first and second supplemental data expanded at the first and second rates, respectively, according to the data attribute information; and
    a processor for coding the data multiplexed by the first multiplexer for error correction,
    wherein values of the plurality of memory elements are initialized into attribute information corresponding to a next enhanced mode map when an enhanced mode is changed from the current enhanced mode map to the next enhanced mode map,
    wherein the bit repeating and interleaving unit has an input terminal, the plurality of memory elements are arranged in series, and the input terminal receives enhanced packet attribute information, and
    wherein the values of the plurality of memory elements are initialized before supplemental data corresponding to the next enhanced mode mare are interleaved by the pre-processor.

2. The transmitter of claim 1, wherein the first and second rates are 1/2 and 1/4, respectively.

3. The transmitter of claim 1, wherein the data attribute information includes enhanced packet attribute information, enhanced byte attribute information, main and enhanced packet attribute information, and symbol attribute information.

4. The transmitter of claim 3, wherein the enhanced packet attribute information indicates whether a supplemental data packet is to be expanded at the first or second rate.

5. The transmitter of claim 3, wherein the enhanced byte attribute information indicates whether a supplemental data byte is to be expanded at the first or second rate.

6. The transmitter of claim 3, wherein the main and enhanced packet attribute information indicates whether a packet is a main data packet or an expanded supplemental data packet.

7. The transmitter of claim 3, wherein the symbol attribute information indicates attribute information of a symbol.

8. The transmitter of claim 3, wherein the pre-processor comprises:
    a second multiplexer for multiplexing the first and second supplemental data according to the enhanced packet attribute information;
    an enhanced Reed-Solomon (RS) encoder for RS coding the first and second supplemental data multiplexed by the second multiplexer;
    an enhanced data interleaver for interleaving the RS coded first and second supplemental data;
    a byte expander for expanding the interleaved first and second supplemental data at the first and second rates, respectively, according to the enhanced byte attribute information; and
    a header inserter for inserting a header into each packet expanded by the byte expander.

9. The transmitter of claim 3, wherein the first multiplexer multiplexes the main data with the first and second supplemental data according to the main and enhanced packet attribute information.

10. The transmitter of claim 1, wherein a total number of the plurality of memory elements is 45.

11. A method of processing a signal in a transmitter, the method comprising:
    initializing values of a plurality of memory elements into attribute information corresponding to a next enhanced mode map when an enhanced mode is changed from a currently enhanced mode map to a next enhanced mode map;
    generating data attribute information based on the current enhanced mode map, the data attribute information being generated by a data attribute generator, the data attribute generator comprising a bit repeating and interleaving unit comprising the plurality of memory elements;
    coding first and second supplemental data for error correction;
    interleaving the coded first and second supplemental data;
    expanding the interleaved first and second supplemental data at first and second rates, respectively, according to the data attribute information;
    multiplexing main data with the expanded first and second supplemental data according to the data attribute information; and
    coding the multiplexed main and supplemental data for error correction,
    wherein the bit repeating and interleaving unit has an input terminal, the plurality of memory elements are arranged in series, and the input terminal receives enhanced packet attribute information, and
    wherein the values of the plurality of memory elements are initialized before supplemental data corresponding to the next enhanced mode map are interleaved by the pre-processor.

12. The method of claim 11, wherein the first and second rates are 1/2 and 1/4, respectively.

13. The method of claim 11, wherein the data attribute information includes enhanced packet attribute information, enhanced byte attribute information, main and enhanced packet attribute information, and symbol attribute information.

14. The method of claim 13, wherein coding first and second supplemental data for error correction comprises:

multiplexing the first and second supplemental data according to the enhanced packet attribute information; and Reed-Solomon (RS) coding the multiplexed first and second supplemental data using an RS encoder.

15. The method of claim 13, wherein the interleaved first and second supplemental data at the first and second rates, respectively, according to the enhanced byte attribute information.

16. The method of claim 13, wherein the main data and the expanded first and second supplemental data are multiplexed according to the main and enhanced packet attribute information.

17. A transmitter comprising:
a data attribute generator comprising:
a first attribute generator for generating enhanced packet attribute information based on a current enhanced mode map, the enhanced packet attribute information indicating whether a supplemental data packet is to be expanded at a first or second rate;
a second attribute generator for generating enhanced byte attribute information based on the enhanced packet attribute information, the enhanced byte attribute information indicating whether each byte of the supplemental data packet is to be expanded at the first or second rate; and
a third attribute generator for generating main and enhanced packet attribute information indicating whether a data packet is a main data packet or an enhanced supplemental data packet; and
a pre-processor comprising:
a first multiplexer for multiplexing first and second supplemental data packets according to the enhanced packet attribute information; and
a byte expander for expanding each byte of the multiplexed first and second supplemental data packets according to the enhanced byte attribute information,
wherein the data attribute generator further comprises a bit repeating and interleaving unit having a plurality of memory elements,
wherein values of the plurality of memory elements are initialized into attribute information corresponding to a next enhanced mode map when an enhanced mode is changed from the current enhanced mode map to the next enhanced mode map,
wherein the bit repeating and interleaving unit has an input terminal, the plurality of memory elements are arranged in series, and the input terminal receives enhanced packet attribute information, and
wherein the values of the plurality of memory elements are initialized before supplemental data corresponding to the next enhanced mode mare are interleaved by the pre-processor.

18. The transmitter of claim 17, further comprising a second multiplexer for multiplexing main data packets with the expanded first and second supplemental data packets according to the main and enhanced packet attribute information.

19. The transmitter of claim 18, further comprising a processor for coding the data packets multiplexed by the second multiplexer for error correction.

20. The transmitter of claim 17, wherein the data attribute generator further comprises a symbol attribute generator for generating attribute information of symbols.

21. The transmitter of claim 17, wherein a total number of the plurality of memory elements is 45.

22. A receiver comprising:
a tuner for selecting a channel to receive a signal including main data packets, first supplemental data packets expanded at a first rate, and second supplemental data packets expanded at a second rate;
a demodulator for demodulating the signal;
a map information recovery unit for recovering a current enhanced mode map from the demodulated signal; and
a data attribute generator comprising:
a first attribute generator for generating enhanced packet attribute information based on the recovered enhanced mode map, the enhanced packet attribute information indicating whether a supplemental data packet included in the demodulated signal is expanded at the first rate or the second rate;
a second attribute generator for generating enhanced byte attribute information based on the enhanced packet attribute information, the enhanced byte attribute information indicating whether each byte of the supplemental packet is expanded at the first rate or the second rate; and
a third attribute generator for generating main and enhanced packet attribute information indicating whether a data packet included in the demodulated signal is a main data packet or an enhanced supplemental data packet,
wherein the data attribute generator further comprises a bit repeating and interleaving unit having a plurality of memory elements,
wherein values of the plurality of memory elements are initialized into attribute information corresponding to a next enhanced mode map when an enhanced mode is changed from the current enhanced mode map to the next enhanced mode map,
wherein the bit repeating and interleaving unit has an input terminal, the plurality of memory elements are arranged in series, and the input terminal receives the enhanced packet attribute information, and
wherein the values of the plurality of memory elements are initialized before supplemental data corresponding to the next enhanced mode mare are interleaved.

23. The receiver of claim 22, further comprising:
a channel equalizer for correcting channel distortion of the demodulated signal; and
a channel decoder for decoding the channel-equalized signal using the enhanced packet attribute information, the enhanced byte attribute information, and the main and enhanced packet attribute information.

24. The receiver of claim 22, wherein the data attribute generator further comprises a symbol attribute generator for generating attribute information of symbols included in the demodulated signal.

25. The receiver of claim 22, wherein a total number of the plurality of memory elements is 45.

26. A method of processing a digital broadcast signal in a receiver comprising:
tuning digital broadcast data, wherein the digital broadcast data result from randomizing 1/2 enhanced data and 1/4 enhanced data, the 1/2 enhanced data being data expanded by a 1/2 code rate, the 1/4 enhanced data being data expanded by a 1/4 code rate;
Reed-Solomon (RS) encoding the 1/2 enhanced data mixed with the 1/4 enhanced data, convolutional encoding the RS-encoded 1/2 enhanced data mixed with 1/4 enhanced data, symbol-to-byte converting the convolutional-encoded 1/2 enhanced data mixed with 1/4 enhanced data, deinterleaving the symbol-to-byte-converted 1/2 enhanced data mixed with 1/4 enhanced data, RS encoding and adding 20 parity bytes of data to the deinterleaved 1/2 enhanced data mixed with 1/4 enhanced data, interleaving the RS encoded 1/2 enhanced data mixed with 1/4 enhanced data, and trellis encoding the interleaved 1/2 enhanced data mixed with 1/4 enhanced data, wherein mode information is inserted into the 1/2 enhanced data mixed with 1/4 enhanced data, the mode information being information on whether portions of the 1/2 enhanced data mixed with 1/4 enhanced data is the 1/2 enhanced data or the 1/4 enhanced data;

recovering the mode information in the 1/2 enhanced data mixed with 1/4 enhanced data;

generating data attribute information based on the mode information, the data attribute information generated by a data attribute generator, the data attribute generator comprising a bit repeating and interleaving unit comprising a plurality of memory elements; and decoding the tuned 1/2 enhanced data mixed with 1/4 enhanced data based on the mode information, wherein the bit repeating and interleaving unit has an input terminal, the plurality of memory elements are arranged in series, and the input terminal receives enhanced packet attribute information, and wherein the values of the plurality of memory elements are initialized before supplemental data corresponding to the next enhanced mode map are interleaved.

* * * * *